Feb. 5, 1957  C. G. MATSON  2,780,299
VEHICLE STEERABLE DRIVE GEAR
Filed May 21, 1954
Fig.1
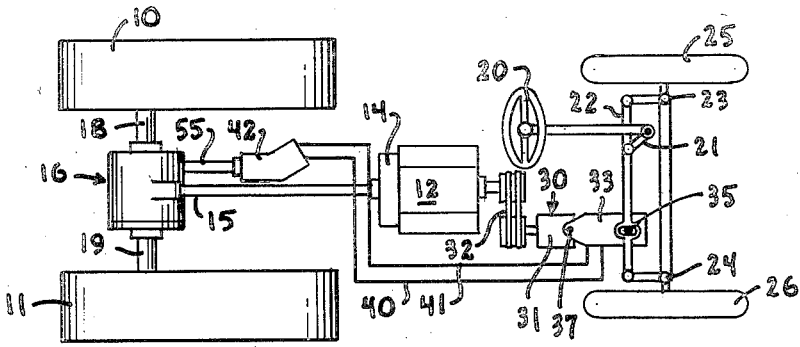
Fig.2
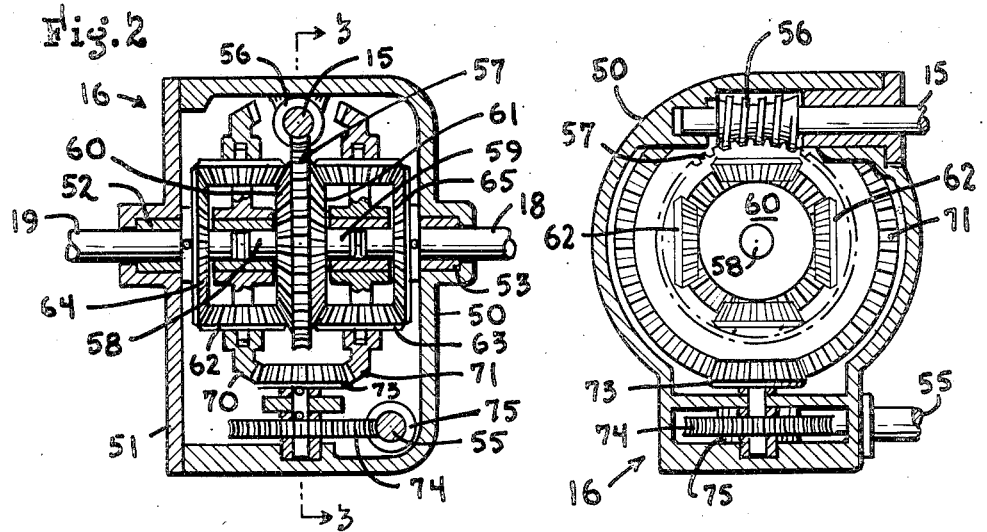
Fig.3
Fig.4
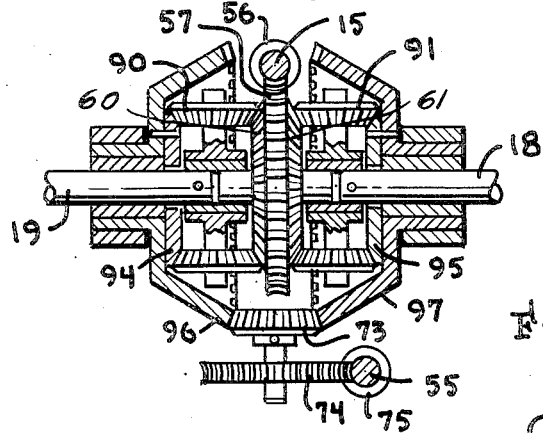
Carl G. Matson,
INVENTOR.
BY 2,780,299

VEHICLE STEERABLE DRIVE GEAR

Carl G. Matson, Kewanee, Ill.

Application May 21, 1954, Serial No. 437,761

2 Claims. (Cl. 180—6.28)

My present invention relates to a control system for powered vehicles and more particularly to a system wherein the driving members of such a vehicle are caused to operate at different speeds during turning maneuvers of the vehicle for steering same.

It has hitherto been proposed that differential clutching or braking devices can be used in connection with the drive mechanism that propels the vehicles and such devices are presently used in track laying vehicles, which devices release brakes or engage clutches under the influence of a pair of levers to obtain control. This type control is substantially different than encountered in other vehicles such as tractors and automobiles, and accordingly calls for a different type of operation than the ordinary operator is accustomed to. In addition, power is usually wasted during maneuvering.

Although several devices have been proposed for employing a steering wheel or similarly functioning connecting levers, these devices have failed to obtain high efficiency together with "feel" of control for the operator thereof. In other words, prior devices have not provided a highly efficient device and have proved to be expensive as well as not entirely satisfactory in the precision of control obtainable. Some of these devices which use wheels, have not provided for turning and holding the steering wheel; but have required continuous rotation thereof. Others have merely operated levers and brakes or clutches by means of the steering wheel.

My improved control system provides, for the first time, a system which can be handled substantially exactly like present motor vehicles in highway service. The system can be designed to have driver "feel" substantially the same as in such vehicles to thereby render the same less likely to cause errors of judgment in operating same by a relatively unskilled operator. My device may be modified in ways mentioned below to meet a wide variety of applications from sports cars and light tractors to huge track laying or multi-wheeled vehicles. The device can further provide a type of "fixed wheel" steering control in a multi-axled vehicle not heretofore economically or mechanically feasible. These and other advantages are obtained in my control system by a plurality of planetary gears associated with a plurality of driving systems therefor transferring torque from the engine through two transmission systems, one of which systems is a conventional drive system, and the other of which includes variable capacity reversible torque devices that may be electrical or hydraulic—the hydraulic system being shown and described.

It is a broad object of my invention to provide control means associated with a steering wheel, and differential gear members associated with the driving mechanism, for maneuvering the vehicle in substantially the same manner that a conventional automobile or truck is maneuvered.

It is a further more specific object of my invention to provide flexible control means incorporating an infinitely variable speed device that is in addition reversible to attain steering in a vehicle substantially in the manner as obtained in a conventional automobile.

It is still a further and more specific object of my invention to provide a control dependent differential gear drive mechanism having a control member that can be rotated at different speeds to maneuver the vehicle.

It is a still more more specific object of my invention to provide an improved differential mechanism providing positive drive to more than one propelling mechanism of a vehicle at all times during translation thereof above a predetermined speed.

The above and other objects of my invention will be either obvious or pointed out in the following specification and claims when interpreted in view of the accompanying figures of drawings of which, Figure 1 is a diagrammatic view of one type of vehicle having a track laying propelling mechanism and steerable front wheels.

Figure 2 is a view of one modification of my invention which is preferred for light duty service, which view looks rearwardly into the interior of the differential gear casing.

Figure 3 is a sectional view taken substantially along the lines 3—3 of Figure 2.

Figure 4 is a view similar to Figure 2 but showing a form of my invention preferred for heavy duty service as in track laying vehicles, a section of which, now shown, will be substantially the same as Figure 3.

Referring more in detail to the drawings and first to Figure 1, wherein a half track vehicle is shown diagrammatically. It is to be understood that in its broad concept my invention can be used with wheeled vehicles, track laying vehicles of different types and is not to be limited only to the device shown diagrammatically in Figure 1 by way of example. A pair of tracks 10 and 11 are driven from a conventional engine 12 through a clutch and transmission 14, a drive shaft 15, my improved differential generally indicated at 16 and a pair of axles 18 and 19 respectively. As will appear below, the rotation of the shaft 15 by the engine 12 causes the shafts 18 and 19 to operate to turn the tracks 10 and 11 respectively to propel the vehicle. It is to be understood that the transmission 14 may be of the reversible kind and that other conventional equipment is also to be utilized such as brakes etc., which have not been shown inasmuch as they have no particular bearing upon operation of the vehicle.

The vehicle is steered through a conventional steering wheel 20 which through a lever 21 and link 22 can rotate bell cranks 23 and 24 to cause the wheels 25 and 26 respectively to be turned in conventional manner upon turning of the steering wheel 20.

When the steering wheel is turned I have also arranged to turn a variable delivery pump generally indicated at 30. The pump 30 has a driving end 31 that may be turned by belts 32 or the like rotated by the engine 12. The pump 30 has a movable end 33 connected by a pivot and slot connection 35 to the link 22. Accordingly, when the link 22 is moved by rotating the steering wheel 20 the movable member 33 will also be moved about a pivot 37 to vary the output of the pump 30. The pump 30 may be a standard item of manufacture such as presently marketed by several different well known companies. These pumps have what is known as a swash plate and pistons connected thereto by ball joints. When the movable portion 33 is rotated about its pivot mounting 37 the amount of oil circulated by the pump will vary to different degrees depending upon the displacement from neutral and hence the relative angle of intercept of the longitudinal axes of the pistons with the plane of the swash plate. In addition to this, as the movable part is moved clockwise or counterclockwise out of alignment with the center line of the member 31 the delivery of oil reverses its flow, hence it is seen that a reversible control is obtained. Of course, in the neutral position shown, no oil is delivered and hence very little engine power is consumed. I make use of this characteristic of such equipment to obtain right and left turning of the vehicle either with or without steering wheels such as the wheels 25 or 26 for example. In fact, it is contemplated that this invention might well find use in the heavy earth moving equipment wherein the problem of steerable wheels being turned same is difficult, inasmuch as my invention enables such vehicles to be turned by differential rotation of wheels whether these be front wheels or rear wheels or both.

The variable pump 30 is connected by pipe lines 40 and 41 to a fixed displacement motor 42 that may be any of several types but is preferably of a similar piston type having the barrel containing the cylinder axes always disposed at an angle with respect to the driven swash plate contained therein. Such items are likewise a product of several different well known companies, and available on the market. The hydraulic system is preferably charged at all times by positive pressure, for example 30 pounds and air bleed means and supply means, not shown, may be incorporated in the system to maintain the same free of air and full of oil at all times. Such a system will give very sharp response to controlled movement of the variable pump 30.

Referring now to Figures 2 and 3, a controllable differential gear 16 is shown of a type preferred for light duty vehicles such as half tracks or the like. The entire device may be mounted in a casing 50 having a part 51 secured thereto, said part supporting a shaft bearing 52. The casing 50 contains a shaft bearing 53 for the shaft 18. Although not shown in detail, it is to be understood that different types of bearings and different arrangement of parts could be utilized where it is considered more convenient to receive the drive shaft 15 and a control shaft 55 that is driven by the motor 42 in different positions to effect the most suitable control of the mechanism 16 now to be described.

The drive shaft 15 may turn a worm 56 or the like which in turn will turn a worm wheel 57. The worm wheel is secured to bearings 58 and 59 and also secured thereto are drive gears 60 and 61. These drive gears 60 and 61 mesh respectively with planet gears 62 and 63 which in turn mesh with output gears 64 and 65 to turn the shafts 19 and 18 respectively. The planet gears in straight ahead motion of the vehicle are held stationary by ring gears 70 and 71 respectively which mesh with a pinion 73 connected to a gear or worm wheel 74 which in turn meshes with a pinion or worm 75 or the like secured to the control shaft 55. For this condition of equal rotation of the shafts 18 and 19, each will receive substantially equal torque through the above described gearing and the driving mechanisms 10 and 11 will be constrained to revolve at identical speeds and thus propel the vehicle straight ahead.

When steering wheel 20 is turned away from the neutral position shown, the movable part 33 of the pump 30 will be moved and will cause (through the hydraulic system mentioned above) rotation of the control shaft 55 and thus the worm 75 which in turn drives the worm wheel 74 and the pinion 73. If the wheel 20 were turned in a clockwise direction it would cause the wheels to rotate clockwise to turn the vehicle in a downward direction as viewed in the Figure 1. In this condition the track 10 should turn faster than the track 11. Accordingly, the shaft 18 should turn faster than the shaft 19 and thus the ring gear 71 should turn in a clockwise direction as viewed in Figure 4 more rapidly than the ring gear 70. Accordingly, assuming a left hand worm the shaft 55 should turn in a clockwise direction as viewed in Figure 3. As explained above this motion will be at a speed depending upon the amount of displacement of the steering wheel 20 from a given neutral position which controls the rate of turn at a given speed. It is to be noted that the speed of the vehicle is automatically compensated for in the device because the driven end 31 of the pump 30 is connected with the motor 12 which motor also connects to the drive mechanism through the shaft 15. If "feel" of the control is desirable the pitch and gear sizing of the mechanism may be altered. For example, with a high gear ratio between the worm 75 and the worm wheel 74 there is very little feel and little tendency for the tracks 10 and 11 to tend to center back to zero. With a low gear ratio, more work would need be done at the steering wheel 20 and more feel of the operation of the device and more tendency for it to come back to neutral wherein both wheels receiving the same torque will prevail. In the device disclosed in Figure 2 and Figure 3 substantial feel may be desirable inasmuch as such transmission might well be used in light farm vehicles and racing vehicles, for example.

Figure 4 shows a form of my invention which employs additional gear reduction over that available in the form shown in Figures 2 and 3. In Figure 4 parts identical to those described above contain identical numbers and only the different parts are numbered differently. The input shaft 15 here turns planet gears 90 and 91 respectively which are fixedly attached to the shafts 19 and 18 respectively to drive same. With this arrangement, as the worm 57 rotates it rolls the planet gears 90 and 91 upon gears 94 and 95 to thus obtain a 2:1 gear reduction ratio which is desirable in heavy applications to reduce the overall size of the transmission mechanism. The gears 94 and 95 are normally held stationary inasmuch as they are connected with ring gears 96 and 97 respectively which mesh with the pinion 73. For normal straight ahead movement the control shaft 55 is stationary and the above mentioned action obtains and the shafts 18 and 19 receive equal torque and rotate at the same speed.

When it is desired to maneuver the vehicle the shaft 55 may be caused to rotate under influence of the hydraulic mechanism described in connection with Figure 1 and will differentially rotate the ring gears 96 and 97 so that there is a relative rotation between the shafts 18 and 19 and thus turning is obtained for the vehicle. It is to be noted that the steering function also has a 2:1 mechanical advantage with respect to the planet gears 90 and 91. Accordingly this modification of my invention has less inherent "feel" than the modification shown in Figures 2 and 3 and is more adaptable to high torque usage with a minimum of gear reduction parts.

It is further to be noted that with the clutch mechanism 14 disengaged the drive shaft 15 will not be turned. In this condition the control wheel 20 can be turned to effect turning of the vehicle at substantially zero translational speed. This may be especially useful to tractor and fully tracked vehicles. It is also obvious that rotatable but non-steerable front wheels can be used to obtain steering by using a drive mechanism in connection with the front axles also, in the same manner as described in connection with the rear axles. In fact, any desired number of drive axles may be employed so long as each set of wheels or the like is provided with a variable pump and fixed volume motor of equal capacities or sized to the wheels they drive, to prevent one motor from "racing" with respect to another.

While I have shown and described specific modifications of my invention including hydraulic controls, obviously other arrangements thereof such as the electrical analogy and gear rearrangements will occur to those skilled in the art. Also, it would be obvious to provide a non reversible pump and valves to obtain control as described above. Accordingly, I wish not to be limited in my in-

I claim:

1. Vehicle differential drive and steering gearing comprising in combination, a source of power, a pair of rotatable axles adapted to be driven by said source, and gearing interposed between said source and said axle; said gearing comprising, a first pair of gears, a pair of planetary gear sets meshing with said first pair of gears, one of said gears of one of said pairs of gearing being connected to one of said axles, and the other of said gears of said one of said pairs of gearing being connected to the other of said axles, a first input gear drivingly connected with said source and said pair of planetary gear sets, a second input gear connected between one of said pairs of gearing to drive one of same relatively with respect to the other; and control means including steering means connected with said second input gear to drive the same in response to steering movement.

2. Vehicle differential drive and steering gearing comprising in combination, a source of power, a pair of rotatable axles adapted to be driven by said source, and reduction gearing interposed between said source and said axles; said reduction gearing comprising, a first pair of gears rotated by said source, a pair of planetary gear sets meshing with said first pair of gears and connected to said axles for driving same, a second pair of gears meshing with said planetary gear sets, auxiliary power input means including a differential drive gear connected with said second pair of gears for driving same relative to each other, and means power operated in response to steering movement for driving said differential drive gear.

References Cited in the file of this patent
UNITED STATES PATENTS
2,336,912    Zimmermann _____ Dec. 14, 1943